(12) United States Patent
Kohtake et al.

(10) Patent No.: US 12,331,378 B2
(45) Date of Patent: Jun. 17, 2025

(54) STEEL SHEET AND METHOD FOR PRODUCING SAME

(71) Applicant: NIPPON STEEL CORPORATION, Tokyo (JP)

(72) Inventors: Takahiko Kohtake, Tokyo (JP); Koutarou Hayashi, Tokyo (JP); Yoshihiro Suwa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 483 days.

(21) Appl. No.: 17/911,974

(22) PCT Filed: Mar. 17, 2021

(86) PCT No.: PCT/JP2021/010853
§ 371 (c)(1),
(2) Date: Sep. 15, 2022

(87) PCT Pub. No.: WO2021/200164
PCT Pub. Date: Oct. 7, 2021

(65) Prior Publication Data
US 2023/0021370 A1    Jan. 26, 2023

(30) Foreign Application Priority Data

Apr. 3, 2020 (JP) .................................. 2020-067685

(51) Int. Cl.
| | |
|---|---|
| *C21D 9/46* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C23C 2/06* | (2006.01) |
| *C23C 2/40* | (2006.01) |

(52) U.S. Cl.
CPC ............ *C21D 9/46* (2013.01); *C21D 8/0226* (2013.01); *C21D 8/0236* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C23C 2/06* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 2017/0051378 A1 | 2/2017 | Lee et al. |
| 2018/0371569 A1 | 12/2018 | Kwak et al. |
| 2019/0276907 A1 | 9/2019 | Yamashita et al. |
| 2019/0345577 A1 | 11/2019 | Hirashima et al. |
| 2020/0087764 A1 | 3/2020 | Sano et al. |
| 2021/0115528 A1* | 4/2021 | Magar .................... C22C 38/12 |

FOREIGN PATENT DOCUMENTS

| | | |
|---|---|---|
| JP | 2017-519900 A | 7/2017 |
| JP | 6323618 B1 | 4/2018 |
| WO | WO2017/183348 A1 | 10/2017 |
| WO | WO2018/105003 A1 | 6/2018 |

OTHER PUBLICATIONS

Furukawa et al., "Formation of Retained Austenite and Mechanical Properties in Low-carbon Steels Treated with Simple Heat Treatment", Japan, the Japan Society for Heat Treatment, 1997, vol. 37, No. 4, pp. 204-211.

* cited by examiner

*Primary Examiner* — Jenny R Wu
(74) *Attorney, Agent, or Firm* — Birch, Stewart, Kolasch & Birch, LLP

(57) ABSTRACT

A steel sheet has a predetermined chemical composition containing, in mass %, C: more than 0.18% and less than 0.30%, Mn: more than 2.50% and 4.00% or less, and other elements. The steel micro-structure at a position at a depth of ¼ of the sheet thickness from the surface in an L cross section of the steel sheet is, in area %, tempered martensite: 25 to 90%, ferrite: 5% or less, retained austenite: 10 to 50%, and bainite: 5% or less. At a position at a depth of ¼ of the sheet thickness from the surface of the L cross section, the proportion of a total area of retained austenite grains having an area of 1 μm² or more and having a grain shape circularity of 0.1 or more is less than 50% with respect to the entire area of retained austenite. The steel sheet satisfies the formula $C_{Mn\gamma}/C_{Mn\alpha} \geq 1.2$.

17 Claims, No Drawings

STEEL SHEET AND METHOD FOR PRODUCING SAME

TECHNICAL FIELD

The present invention relates to a steel sheet and a method for producing the steel sheet.

BACKGROUND ART

In general, when the strength of a steel sheet is increased, elongation is reduced and the formability of the steel sheet may decrease. Therefore, in order to use a high-strength steel sheet as a component for a body of an automobile, it is necessary to increase both strength and formability which are mutually conflicting properties, that is, a more excellent strength-ductility balance is required. Further, a high-strength steel sheet to be used for vehicle body components is required to have excellent bendability and impact characteristics. Therefore, as the mechanical properties of such a steel sheet, the steel sheet is required to have high strength and excellent formability, and also have excellent bendability and impact characteristics.

In order to improve elongation that affects the formability, thus far a so-called "medium Mn steel" has been proposed in which Mn is positively added so as to contain about 5% by mass of Mn in the steel sheet and form retained austenite in the steel, and utilize the transformation induced plasticity thereof (for example, Non-Patent Document 1).

Further, Patent Document 1 proposes steel in which Mn is contained in an amount ranging from 2.6% or more to 4.2% or less. Since the aforementioned steel also contains more Mn than general high-strength steel, retained austenite is easily formed and the elongation is high, and the steel is even more excellent in bendability.

LIST OF PRIOR ART DOCUMENTS

Patent Document

Patent Document 1: WO 2017/183348

Non Patent Document

Non-Patent Document 1: Furukawa Takashi and Matsumura Osamu, Heat Treatment, Japan, the Japan Society for Heat Treatment, 1997, vol. no. 37, no. 4, p. 204

SUMMARY OF INVENTION

Technical Problem

However, because the content of Mn in the steel sheet disclosed in Non-Patent Document 1 is high, the production cost increases. Therefore, a steel sheet having less alloy elements and which, while having a smaller content of Mn, has both strength and elongation in a compatible manner, and also has impact characteristics is needed.

An objective of the present invention is to solve the problem described above and provide a steel sheet which has high strength and is excellent in strength-ductility balance, bendability and impact characteristics.

Solution to Problem

The present invention has been made to solve the problem described above, and the gist of the present invention is a steel sheet and a method for producing the steel sheet described in the following.

(1) A steel sheet, having a chemical composition consisting of, in mass %:
C: more than 0.18% and less than 0.30%,
Si: 0.01% or more and less than 2.00%,
Mn: more than 2.50% and 4.00% or less,
sol. Al: 0.001% or more and less than 3.00%,
P: 0.100% or less,
S: 0.010% or less,
N: less than 0.050%,
O: less than 0.020%,
Cr: 0% or more and less than 2.00%,
Mo: 0 to 2.00%,
W: 0 to 2.00%,
Cu: 0 to 2.00%,
Ni: 0 to 2.00%,
Ti: 0 to 0.300%,
Nb: 0 to 0.300%,
V: 0 to 0.300%,
B: 0 to 0.010%,
Ca: 0 to 0.010%,
Mg: 0 to 0.010%,
Zr: 0 to 0.010%,
REM: 0 to 0.010%,
Sb: 0 to 0.050%,
Sn: 0 to 0.050%,
Bi: 0 to 0.050%, and
the balance: Fe and impurities,
wherein:
in a cross section parallel to a rolling direction and a sheet thickness direction of the steel sheet, a steel micro-structure at a position at a depth of ¼ of a sheet thickness from a surface is, in area %:
tempered martensite: 25 to 90%,
ferrite: 5% or less,
retained austenite: 10 to 50%, and
bainite: 5% or less;
at a position at a depth of ¼ of the sheet thickness from a surface of a cross section parallel to the rolling direction and the sheet thickness direction of the steel sheet, a proportion of a total area of retained austenite grains having an area of 1 μm² or more and having a grain shape circularity of 0.1 or more is less than 50% with respect to an entire area of the retained austenite; and
an Mn concentration in the steel micro-structure at a position at a depth of ¼ of the sheet thickness from the surface satisfies formula (i) below:

$$C_{Mn\gamma}/C_{Mn\alpha} \geq 1.2 \qquad (i)$$

where, meaning of each symbol in formula (i) above is as follows:
$C_{Mn\gamma}$: average Mn concentration (mass %) in retained austenite
$C_{Mn\alpha}$: average Mn concentration (mass %) in ferrite and tempered martensite.
(2) The steel sheet according to (1) above, wherein:
the chemical composition contains, in mass %,
Si: 0.10% or more and less than 2.00%; and
an Si concentration in the steel micro-structure at a position at a depth of ¼ of the sheet thickness from the surface of a cross section parallel to the rolling direction and sheet thickness direction of the steel sheet satisfies formula (ii) below:

$$C_{Si\alpha}/C_{Si\gamma} \geq 1.1 \qquad (ii)$$

where, meaning of each symbol in formula (ii) above is as follows:

$C_{Si\alpha}$: average Si concentration (mass %) in tempered martensite and ferrite $C_{Si\gamma}$: average Si concentration (mass %) in retained austenite.

(3) The steel sheet according to (1) or (2) above, wherein: the chemical composition contains one or more kinds of element selected from, in mass %, Cr: 0.01% or more and less than 2.00%,
Mo: 0.01 to 2.00%,
W: 0.01 to 2.00%,
Cu: 0.01 to 2.00%, and
Ni: 0.01 to 2.00%.

(4) The steel sheet according to any one of (1) to (3) above, wherein:
the chemical composition contains one or more kinds of element selected from, in mass %,
Ti: 0.005 to 0.300%,
Nb: 0.005 to 0.300%, and
V: 0.005 to 0.300%.

(5) The steel sheet according to any one of (1) to (4) above, wherein:
the chemical composition contains one or more kinds of element selected from, in mass %,
B: 0.0001 to 0.010%,
Ca: 0.0001 to 0.010%,
Mg: 0.0001 to 0.010%,
Zr: 0.0001 to 0.010%, and
REM: 0.0001 to 0.010%.

(6) The steel sheet according to any one of (1) to (5) above, wherein:
the chemical composition contains one or more kinds of element selected from, in mass %,
Sb: 0.0005 to 0.050%,
Sn: 0.0005 to 0.050%, and
Bi: 0.0005 to 0.050%.

(7) The steel sheet according to any one of (1) to (6) above, having:
a hot dip galvanized layer on a surface of the steel sheet.

(8) The steel sheet according to any one of (1) to (6) above, having:
a hot dip galvannealed layer on a surface of the steel sheet.

(9) The steel sheet according to any one of (1) to (8) above, wherein:
a Charpy impact value at 20° C. is 20 J/cm² or more.

(10) A method for producing a steel sheet, that is a method in which a hot rolling process, a cold rolling process, a primary annealing process and a secondary annealing process are performed in that order on steel having a chemical composition according to (1) or any one of (3) to (6) above, wherein:
the hot rolling process includes a process of performing finish hot-rolling using a rolling mill having a plurality of stands, the number of which is four or more;
in the process of performing finish hot-rolling:
a sheet thickness reduction between before and after a last four stands among the plurality of stands satisfies formula (iii) below,
a strain rate at a final stand of the last four stands and a rolling exit side temperature at the final stand satisfy formula (iv) below, and
cooling to 750° C. at an average cooling rate of 100° C./s or more is performed within 1.0 s after rolling at the final stand, and cooling in a temperature range from 750° C. to 300° C. is performed at an average cooling rate of 10° C./s or more;
in the primary annealing process, after holding for 10 to 1000 s in a temperature region of more than 750° C. and an $Ac_3$ point or more, cooling is performed to a temperature region of 300° C. or less under a condition that an average cooling rate to 300° C. is 10 to 2000° C./s, and thereafter cooling is performed to a temperature region of less than 100° C.; and
in the secondary annealing process, heating is performed to a temperature region of 650° C. or more and less than the $Ac_3$ point at an average heating rate of 1 to 40° C./s, and is held in the temperature region for 300 s or more:

$$1.2 \leq \ln(t_0/t) \leq 2.8 \quad \text{(iii)}$$

$$11.0 \leq \log(v \cdot \exp(33000/(273+T))) \leq 15.0 \quad \text{(iv)}$$

where, meaning of each symbol in the above formulas is as follows:
$t_0$: sheet thickness (mm) immediately before entering last four stands
$t$: sheet thickness (mm) immediately after exiting from last four stands
$v$: strain rate (/s) at final stand
$T$: rolling exit side temperature (° C.) at final stand.

(11) The method for producing a steel sheet according to (10) above, wherein:
in the primary annealing process, after holding for 10 s or more in a temperature region of more than 750° C. and the $Ac_3$ point or more, cooling is performed at an average cooling rate of 10 to 2000° C./s to a temperature region of 300° C. or less, and after holding for 10 to 1000 s in a temperature region of 100 to 300° C., cooling is performed to a temperature region of less than 100° C.

(12) The method for producing a steel sheet according to (10) or (11) above, wherein:
after the secondary annealing process, cooling is performed, and a hot dip galvanizing treatment is performed.

(13) The method for producing a steel sheet according to (12) above, wherein:
after the hot dip galvanizing treatment is performed, a hot dip galvanized layer is subjected to an alloying treatment in a temperature region of 450 to 620° C.

Advantageous Effect of Invention

According to the present invention, a steel sheet can be obtained that has high strength and is excellent in strength-ductility balance, bendability and impact characteristics.

DESCRIPTION OF EMBODIMENT

Hereunder, the respective requirements of the present invention are described in detail.

(A) Chemical Composition

The reasons for limiting each element are as follows. Note that, the symbol "%" with respect to content in the following description means "mass %".

C: More than 0.18% and Less than 0.30%

C is a necessary element for raising the strength of the steel and stabilizing retained austenite. On the other hand, if C is excessively contained, it becomes difficult to maintain the weldability of the steel sheet. Therefore, the content of C is set to more than 0.18% and less than 0.30%. The content of C is preferably 0.20% or more. Further, the content of C is preferably 0.28% or less, and more preferably is 0.25% or less.

Si: 0.01% or More and Less than 2.00%

Si is an effective element for strengthening tempered martensite, making the micro-structure uniform, and improving the strength-ductility balance. Further, Si also has an action that suppresses the precipitation of cementite and promotes formation of retained austenite. On the other hand, if Si is excessively contained, it becomes difficult to maintain the plating properties and chemical treatment properties of the steel sheet. Therefore, the content of Si is set to 0.01% or more and less than 2.00%. In order to satisfy the aforementioned formula (ii) and further improve the impact characteristics of the steel sheet, the content of Si is preferably 0.10% or more, more preferably is 0.20% or more, further preferably is 0.40% or more, and further preferably is 0.70% or more. Further, the content of Si is preferably 1.80% or less, and more preferably is 1.60% or less.

Mn: More than 2.50% and 4.00% or Less

Mn is an element that stabilizes austenite. Further, in the present invention, Mn is distributed throughout the austenite and stabilizes the austenite more. By making the content of Mn 4.00% or less, non-uniformity of the content of Mn due to solidification segregation can be lessened. Furthermore, even if Mn concentrates in retained austenite, because non-uniformity of the strength in the microstructure is also lessened without the steel sheet markedly hardening, the bendability can be improved. In addition, by reducing the content of Mn, it is possible to keep down the production cost of the steel sheet. Therefore, the content of Mn is set to more than 2.50% and 4.00% or less. The content of Mn is preferably more than 3.00%, and more preferably is more than 3.20%. Further, the content of Mn is preferably less than 3.85%, and more preferably is less than 3.70%.

Sol. Al: 0.001% or More and Less than 3.00%

Al is a deoxidizer, and also has an action that expands the temperature range of a two-phase region during annealing and raises the material quality consistency. Although the greater the content of Al, the greater the effect thereof, if Al is excessively contained, it will be difficult to maintain the surface properties, coating properties, and weldability. Therefore, the content of sol. Al is set to 0.001% or more and less than 3.00%. The content of sol. Al is preferably 0.005% or more, more preferably is 0.010% or more, and further preferably is 0.020% or more. Furthermore, the content of sol. Al is preferably 2.50% or less, and more preferably 1.80% or less. Note that, in the present description the term "sol. Al" means "acid-soluble Al".

P: 0.100% or Less

P is an impurity, and lowers the weldability of the steel material. Therefore, the content of P is set to 0.100% or less. The content of P is preferably 0.050% or less, more preferably is 0.030% or less, and further preferably is 0.020% or less. Whilst it is not particularly necessary to define a lower limit of the content of P, from the viewpoint of suppressing an increase in the refining cost, the lower limit of the content of P may be set to 0.001% or more, although the lower the content of P is, the more preferable it is.

S: 0.010% or Less

S is an impurity, and as the result of hot rolling, elongated MnS is formed and reduces the bendability and hole expandability. Therefore, the content of S is set to 0.010% or less. The content of S is preferably 0.007% or less, and more preferably is 0.003% or less. Whilst it is not particularly necessary to define a lower limit of the content of S, from the viewpoint of suppressing an increase in the refining cost, the lower limit of the content of S may be set to 0.001% or more, although the lower the content of S is, the more preferable it is.

N: Less than 0.050%

N is an impurity, and if the steel sheet contains N in an amount of 0.050% or more, the low-temperature toughness decreases. Therefore, the content of N is set to less than 0.050%. The content of N is preferably 0.010% or less, and more preferably is 0.006% or less. Whilst it is not particularly necessary to define a lower limit of the content of N, from the viewpoint of suppressing an increase in the refining cost, the lower limit of the content of N may be set to 0.003% or more, although the lower the content of N is, the more preferable it is.

O: Less than 0.020%

O is an impurity, and if the steel sheet contains O in an amount of 0.020% or more, the elongation decreases. Therefore, the content of O is set to less than 0.020%. The content of O is preferably 0.010% or less, more preferably is 0.005% or less, and further preferably is 0.003% or less. Whilst it is not particularly necessary to define a lower limit of the content of O, from the viewpoint of suppressing an increase in the refining cost, the lower limit is preferably set to 0.001% or more.

In addition to the elements mentioned above, one or more kinds of element selected from Cr, Mo, W, Cu, Ni, Ti, Nb, V, B, Ca, Mg, Zr, REM, Sb, Sn and Bi may also be contained in the steel sheet of the present invention.

Cr: 0% or more and less than 2.00%
Mo: 0 to 2.00%
W: 0 to 2.00%
Cu: 0 to 2.00%
Ni: 0 to 2.00%

Cr, Mo, W, Cu, and Ni are elements that improve the strength of the steel sheet, and therefore one or more kinds selected from these elements may be contained. On the other hand, if these elements are excessively contained, surface defects are liable to occur during hot rolling, and furthermore, the strength of the hot-rolled steel sheet may become too high and the cold rolling properties may deteriorate. Therefore, the content of Cr is set to less than 2.00%, the content of Mo to 2.00% or less, the content of W to 2.00% or less, the content of Cu to 2.00% or less, and the content of Ni to 2.00% or less.

The content of Cr is preferably 1.50% or less, 1.00% or less, 0.60% or less, or less than 0.30%. The content of Mo is preferably 1.50% or less, 1.00% or less, 0.50% or less, or 0.10% or less. The content of W is preferably 1.50% or less, 1.00% or less, 0.50% or less, or 0.10% or less. The content of Cu is preferably 1.50% or less, 1.00% or less, 0.60% or less, or 0.20% or less. The content of Ni is preferably 1.50% or less, 1.00% or less, or 0.50% or less. In order to more reliably obtain the effect produced by the aforementioned action of these elements, it is preferable to contain at least any one of the aforementioned elements in an amount of 0.01% or more.

Ti: 0 to 0.300%
Nb: 0 to 0.300%
V: 0 to 0.300%

Ti, Nb, and V form fine carbides, nitrides, or carbonitrides, and are thus effective for improving the strength of the steel sheet. Therefore, one or more kinds of element selected from these elements may be contained in the steel sheet. On the other hand, if these elements are excessively contained, in some cases the strength of the hot-rolled steel sheet increases too much and the cold rolling properties decrease. Therefore, the content of Ti is set to 0.300% or less, the content of Nb to 0.300% or less, and the content of V to 0.300% or less. The content of each of Ti, Nb, and V is preferably 0.200% or less, 0.100% or less, 0.060% or less, or 0.030% or less. In order to more reliably obtain the effect produced by the aforementioned action of these elements, it is preferable to contain at least any one of the aforementioned elements in an amount of 0.005% or more.

B: 0 to 0.010%
Ca: 0 to 0.010%
Mg: 0 to 0.010%
Zr: 0 to 0.010%
REM: 0 to 0.010%

B, Ca, Mg, Zr, and REM (rare earth metal) improve the local ductility and hole expandability of the steel sheet. Therefore, one or more kinds selected from these elements may be contained. On the other hand, if excessively contained, these elements may cause the workability of the steel sheet to decrease. Therefore, the content of B is set to 0.010% or less, the content of Ca to 0.010% or less, the content of Mg to 0.010% or less, the content of Zr to 0.010% or less, and the content of REM to 0.010% or less.

The content of each of B, Ca, Mg, Zr, and REM is preferably 0.008% or less, 0.006% or less, or 0.003% or less. Further, while it suffices that the total content of one or more kinds of element selected from B, Ca, Mg, Zr, and REM is 0.050% or less, the total content is preferably 0.030% or less. In order to more reliably obtain the effect produced by the aforementioned actions of these elements, it is preferable to contain at least any one of the aforementioned elements in an amount of 0.0001% or more, and more preferably in an amount of 0.001% or more.

Here, REM refers to a total of 17 kinds of element including Sc, Y, and lanthanoids, and the term "content of REM" refers to the total content of these elements. In the case of lanthanoids, the lanthanoids are added industrially in the form of misch metal.

Sb: 0 to 0.050%
Sn: 0 to 0.050%
Bi: 0 to 0.050%

Sb, Sn, and Bi keep easily oxidizable elements such as Mn, Si, and/or Al in the steel sheet from diffusing at the steel sheet surface and forming oxides, and thereby improve the surface properties and plating properties of the steel sheet. Therefore, one or more kinds selected from these elements may be contained. However, even if these elements are contained in excess, the effect obtained by the aforementioned action will be saturated. Therefore, the content of Sb is set to 0.050% or less, the content of Sn to 0.050% or less, and the content of Bi to 0.050% or less. The content of each of Sb, Sn, and Bi is preferably 0.030% or less, 0.010% or less, 0.006% or less, or 0.003% or less. In order to more reliably obtain the effect produced by the aforementioned action of these elements, it is preferable to contain at least any one of the aforementioned elements in an amount of 0.0005% or more, and more preferably in an amount of 0.001% or more.

The balance in the chemical composition of the steel sheet of the present invention is Fe and impurities. Here, the term "impurities" refers to components which, during industrial production of the steel material, are mixed in from a raw material such as ore or scrap or due to various causes during the production processes, and which are allowed within a range that does not adversely affect the present invention.

(B) Micro-Structure of Steel Sheet

The micro-structure of the steel sheet according to the present invention is described hereunder. In the following description, the symbol "%" with respect to area fraction means "area %".

In a cross section (also referred to as an "L cross section") parallel to a rolling direction and a sheet thickness direction of the steel sheet according to the present invention, the steel micro-structure at a position at a depth of ¼ of the sheet thickness from the surface includes 25 to 90% of tempered martensite, 5% or less of ferrite, 10 to 50% of retained austenite, and 5% or less of bainite. The fraction of each micro-structure changes depending on the conditions of the annealing, and have an effect on the strength, elongation, and impact characteristics of the steel sheet. The reasons for limiting each micro-structure are described in detail hereunder.

Tempered Martensite: 25 to 90%

Tempered martensite is a micro-structure that increases the strength of the steel sheet and improves the strength-ductility balance and impact characteristics. In order to preferably maintain the strength, elongation, and impact characteristics of the steel sheet within the range of the target strength level, the area fraction of tempered martensite is made 25 to 90%. The area fraction of tempered martensite is preferably 28% or more, and more preferably is 50% or more.

Further, from the viewpoint of hydrogen brittleness, the area fraction of tempered martensite is preferably 80% or less, more preferably 75% or less, and further preferably 70% or less. In addition, by controlling the content of tempered martensite so that the area fraction thereof is 35 to 75%, it is possible to obtain a steel sheet having high strength in which a higher level of both elongation and strength are achieved in a compatible manner.

Ferrite: 5% or Less

In the steel sheet according to the present invention, it is important that the area fraction of ferrite is low. If the area fraction of ferrite is high, the strength will decrease, and if non-recrystallized ferrite remains, the strength-ductility balance will decrease. Therefore, the area fraction of ferrite is made 5% or less. The area fraction of ferrite is preferably 3% or less, and more preferably is 0%.

Retained Austenite: 10 to 50%

Retained austenite is a micro-structure that increases the strength-ductility balance of the steel sheet by transformation induced plasticity. Further, since retained austenite can be transformed to martensite by working that is accompanied by tensile deformation, retained austenite also contributes to improving the strength of the steel sheet. In addition, retained austenite also improves the impact characteristics of the steel sheet. The higher the area fraction of retained austenite is, the more preferably it is. However, in a steel sheet having the chemical composition described above, the upper limit of the area fraction of retained austenite is 50%. Therefore, the area fraction of retained austenite is made 10 to 50%. The area fraction of retained austenite is preferably 18% or more, and more preferably is 20% or more.

Bainite: 5% or Less

In the steel sheet according to the present invention, it is important that the area fraction of bainite is low. MA (Martensite-Austenite constituent) that is a hard micro-structure is present in bainite, and hence the strength-ductility balance decreases. Therefore, the area fraction of bainite is made 5% or less. The area fraction of bainite is preferably 0%. Tempered bainite can also be included in bainite, and no distinction between bainite and tempered bainite is made in the description of the present application.

In the steel sheet according to the present invention, fresh martensite (that is, untempered martensite) is desirable as the other micro-structure than tempered martensite, ferrite, retained austenite, and bainite. Further, with regard to pearlite, whilst pearlite may be included, the possibility that pearlite will be included is low, and preferably the area fraction of pearlite is less than 1%, and more preferably is 0%.

Fresh martensite is a hard micro-structure, and is effective for securing the strength of the steel sheet. In a case where importance is attached to strength, the area fraction of fresh martensite is preferably more than 0%, more preferably is 1% or more, and further preferably is 3% or more. However, the lower the area fraction of fresh martensite is, the higher the bendability of the steel sheet will be. Therefore, from the viewpoint of bendability, the area fraction of fresh martensite is preferably 55% or less, more preferably is 45% or less, and further preferably is 20% or less. In a case where particular importance is attached to bendability, the area fraction of fresh martensite is preferably 10% or less.

In the steel micro-structure at a position at a depth of ¼ of the sheet thickness from the surface of an L cross section of the steel sheet according to the present invention, the total area of retained austenite grains having an area of 1 μm² or more and having a grain shape circularity of 0.1 or more is less than 50% with respect to the entire area of retained austenite.

When the area fraction that the micro-structure of retained austenite in which the area of the grains is 1 μm² or more and the grain shape circularity of the grains is 0.1 or more occupies in the entire micro-structure of retained austenite is less than 50%, a steel sheet that is excellent in strength-ductility balance, impact characteristics, and bendability can be obtained. If retained austenite in which the area of the grains is large and the grain shape circularity is large occupies 50% or more of the entire micro-structure of retained austenite, the strength-ductility balance, impact characteristics, and bendability of the steel sheet will decrease.

In retained austenite in which the area of the grains is less than 1 μm², that is, the grain size is small, since it is easy for Mn to uniformly concentrate in a short time during annealing in the ferrite-austenite two-phase region and hence the stability is high, transformation to the high strain side is delayed. Therefore, a steel sheet excellent in strength-ductility balance and impact characteristics can be obtained.

With respect to the retained austenite, even in the case of retained austenite in which the area of the grains is 1 μm² or more, that is, the grain size is large, if the grain shape circularity is less than 0.1, since most of the grains are present between martensite or between tempered martensite laths, transformation to the high strain region side is delayed due to spatial constraints from the surroundings. Therefore, a steel sheet that is excellent in strength-ductility balance and impact characteristics can be obtained.

Note that, grain shape circularity is expressed by the following formula (v). Further, the grain shape circularity and area of grains can be measured by performing electron back scatter diffraction patterns (EBSP) analysis with a standard function (Map and Grain Shape Circularity) of OIM Analysis version 7 manufactured by TSL Company Ltd.

$$\text{Grain shape circularity} = 4\pi A/P^2 \quad (v)$$

Where, the meaning of each symbol in formula (v) above is as follows:
A: area of grain
P: circumferential length of grain In the steel material of the present invention, the Mn concentration in the steel micro-structure at a position at a depth of ¼ of the sheet thickness from the surface of the L cross section satisfies the following formula (i).

$$C_{Mn\gamma}/C_{Mn\alpha} \geq 1.2 \quad (i)$$

Where, the meaning of each symbol in formula (i) above is as follows:
$C_{Mn\gamma}$: average Mn concentration (mass %) in retained austenite
$C_{Mn\alpha}$: average Mn concentration (mass %) in ferrite and tempered martensite By causing Mn to concentrate in the retained austenite, the retained austenite is stabilized, and the strength-ductility balance and impact characteristics of the steel sheet can be improved by the transformation induced plasticity. Therefore, the higher the value of $C_{Mn\gamma}/C_{Mn\alpha}$ is, the more preferable it is, and the value of $C_{Mn\gamma}/C_{Mn\alpha}$ is 1.2 or more, and preferably is 1.4 or more. Note that, whilst it is not necessary to set an upper limit for the value of $C_{Mn\gamma}/C_{Mn\alpha}$, since the heat treatment time will be long, from the viewpoint of productivity the upper limit is preferably 8.0 or less, and more preferably is 6.0 or less, 4.0 or less or 2.0 or less.

In the steel material of the present invention, preferably the Si concentration in the steel micro-structure at a position at a depth of ¼ of the sheet thickness from the surface of the L cross section satisfies formula (ii) below.

$$C_{Si\alpha}/C_{Si\gamma} \geq 1.1 \quad (ii)$$

Where, the meaning of each symbol in formula (ii) above is as follows.
$C_{Si\alpha}$: average Si concentration (mass %) in tempered martensite and ferrite
$C_{Si\gamma}$: average Si concentration (mass %) in retained austenite By causing Si to concentrate in the tempered martensite and ferrite, the tempered martensite and ferrite are strengthened, and the strength and impact characteristics of the steel sheet can be improved. To obtain the effect of strengthening the tempered martensite and ferrite and improving the impact characteristics, the value of $C_{Si\alpha}/C_{Si\gamma}$ is made 1.1 or more, and preferably 1.2 or more.

In order to make the value of $C_{Si\alpha}/C_{Si\gamma}$ 1.1 or more, it is necessary for the content of Si to be 0.1% or more. If the content of Si is less than 0.1 mass %, the value of $C_{Si\alpha}/C_{Si\gamma}$ will be less than 1.1. Further, in order to make the value of $C_{Si\alpha}/C_{Si\gamma}$ 1.2 or more, the content of Si is set to 0.7% or more. Note that, whilst it is not necessary to set an upper limit for the value of $C_{Si\alpha}/C_{Si\gamma}$, since the heat treatment time will be long, from the viewpoint of productivity the upper limit is preferably 1.8 or less.

Methods for identifying the steel micro-structures and calculating the area fractions are described hereunder.

<Method for Measuring Area Fraction of Retained Austenite>

The area fraction of retained austenite is measured by the X-ray diffraction method. First, from a center portion of the principal surface of the steel sheet, a specimen is cut out which has a width (length in rolling direction) of 25 mm, a length (length in direction orthogonal to rolling direction) of 25 mm, and a thickness that is the thickness in the sheet thickness direction of the as-annealed sample. The specimen is then subjected to chemical polishing to reduce the sheet thickness by ¼ to obtain a specimen having a chemically polished surface. X-ray diffraction analysis is performed three times on the surface of the specimen using a Co tube.

With regard to the fcc phase, the integrated intensities of the respective peaks of (111), (200), and (220) are determined, and with regard to the bcc phase, the integrated intensities of the respective peaks of (110), (200), and (211) are determined. By analyzing the integrated intensities, and the averaging the results obtained by performing X-ray diffraction analysis three times, the volume ratio of retained austenite is determined, and the determined value is regarded as the area fraction of retained austenite.

<Method for Measuring Area Fraction of Tempered Martensite, Ferrite, Bainite, and Fresh Martensite>

The area fractions of tempered martensite, ferrite, bainite, and fresh martensite are calculated based on micro-structure observation using a scanning electron microscope (SEM). After mirror-polishing the L cross section of the steel sheet, the microstructure is revealed using 3% nital (3% nitric acid-ethanol solution). The microstructure in an area of 100 μm in length (length in sheet thickness direction)×300 μm in width (length in rolling direction) at a position at a depth of ¼ of the sheet thickness from the surface of the steel sheet is then observed using an SEM at a magnification of ×5000, and the area fraction of each micro-structure can be measured.

The area fraction of tempered martensite is calculated by determining that, among white micro-structure recognized in the observation using the SEM, a micro-structure whose substructure is confirmed within grains is tempered martensite. Ferrite is distinguished as a grey base micro-structure, and the area fraction thereof is calculated. In the observation by SEM, bainite is an aggregate of lath-shaped grains, and is distinguished as a micro-structure in which carbides extend in the same direction in laths, and the area fraction thereof is calculated.

In the observation by SEM, fresh martensite is recognized as white micro-structure, similarly to retained austenite. Therefore, although it is difficult to differentiate between retained austenite and fresh martensite in the observation by SEM, the area fraction of fresh martensite is calculated by deducting the area fraction of retained austenite measured by the X-ray diffraction method from the total area fraction of retained austenite and fresh martensite obtained by observation by SEM.

<Method for Calculating $C_{Mn\gamma}/C_{Mn\alpha}$ and $C_{Si\alpha}/C_{Si\gamma}$>

$C_{Mn\gamma}$, $C_{Mn\alpha}$, $C_{Si\alpha}$, and $C_{Si\gamma}$ can be measured by EBSP, an SEM, and an electron probe microanalyzer (EPMA). That is, using EBSP and an SEM, a region of 50 μm×50 μm is observed at a magnification of ×500, EBSP data is measured at measurement intervals of 0.1 μm, and with respect to five regions, retained austenite, ferrite, and tempered martensite are identified. Next, with respect to the identified retained austenite and tempered martensite, point analysis by EPMA measurement is performed at five points in five regions, respectively, the measured values are averaged to calculate $C_{Mn\gamma}$, $C_{Mn\alpha}$, $C_{Si\alpha}$, and $C_{Si\gamma}$, and $C_{Mn\gamma}/C_{Mn\alpha}$ and $C_{Si\alpha}/C_{Si\gamma}$ are determined.

(C) Mechanical Properties

Next, the mechanical properties of the steel sheet according to the present invention are described.

The tensile strength (TS) of the steel sheet according to the present invention is preferably 780 MPa or more, more preferably is 980 MPa or more, and further preferably is 1180 MPa or more. This is because, when using the steel sheet as a starting material for automobiles, increasing the strength allows the sheet thickness to be reduced, which contributes to weight reduction. Further, since the steel sheet according to the present invention will be subjected to press forming, it is desirable that elongation after fracture (tEL) is also excellent. The TS×tEL of the steel sheet according to the present invention is preferably 22,000 MPa % or more, and more preferably is 25,000 MPa % or more.

Further, the steel sheet according to the present invention has excellent impact characteristics, and preferably the value of impact energy in a Charpy impact test at 20° C. is 20 J/cm² or more.

(D) Production Method

Next, a steel sheet according to one embodiment of the present invention can be obtained, for example, by a production method including the processes described hereunder.

<Casting Process>

To produce the steel sheet according to the present invention, steel having the aforementioned chemical composition is melted by a conventional method and cast to prepare a steel material (hereunder, also referred to as a "slab"). As long as the steel sheet according to the present invention has the aforementioned chemical composition, the molten steel may be molten steel melted by a normal blast furnace method, or may be molten steel for which the raw material includes a large amount of scrap, as in the case of steel produced by an electric furnace method. The slab may be produced by a normal continuous casting process or may be produced by thin slab casting.

<Hot Rolling Process>

Hot rolling can be performed using a normal continuous hot rolling line. The hot rolling process includes a rough rolling process and a finish rolling process.

Slab heating temperature: 1100 to 1300° C.

The slab to be subjected to the hot rolling process is heated before the hot rolling. By making the temperature of the slab to be subjected to hot rolling 1100° C. or more, deformation resistance during hot rolling can be reduced more. On the other hand, by making the temperature of the slab to be subjected to hot rolling 1300° C. or less, a decrease in the yield due to an increase in scale loss can be suppressed. Therefore, the temperature of the slab to be subjected to hot rolling is preferably made 1100 to 1300° C. Note that, in the description of the present application, the term "temperature" means the surface temperature of a slab, a hot-rolled steel sheet, or a cold-rolled steel sheet.

Whilst the holding time in the aforementioned slab heating temperature range is not particularly limited, in order to improve the stability of the material quality the holding time is preferably 30 minutes or more, and more preferably is 1 hour or more. Further, to suppress excessive scale loss, the holding time is preferably set to 10 hours or less, and more preferably 5 hours or less. In the case of performing hot direct rolling or hot charge rolling, the slab may be subjected to hot rolling as it is without being subjected to a prior heat treatment.

Finishing Hot Rolling:

In the finishing hot rolling process, in tandem rolling in which a steel sheet is continuously rolled using a rolling mill having a plurality of stands numbering four or more, it is important to control the cumulative strain (sheet thickness reduction) produced by rolling at the aforementioned four stands among the plurality of stands, and the rolling temperature and the strain rate at the final stand. Since the rolling mill performs tandem rolling, the strain will be accumulated as long as the strain at the four consecutive rolling stands at the rear end is within a preferable range. Further, at the final stand, by making the strain rate and rolling temperature appropriate, recrystallization in austenite can be caused by the accumulated strain. Usually, six or seven stands are used as the finishing stands for hot rolling in mainstream production. Whilst this number is naturally not limited, in the method for producing the steel sheet according to the present invention, among the plurality of stands, the rolling at the last four stands is controlled to make the strain amount and strain rate fall within a preferable range.

Because the steel sheet is subjected to continuous tandem rolling, as long as the strain rate at the final stand among the aforementioned four or more stands is made appropriate, the inter-pass time periods (three) between the last four stands can be adjusted to obtain a rolling speed and a rolling reduction that enable accumulation of strain. That is, if the rolling speed and rolling reduction on the final stand exit side are determined, the rolling speed at the previous stand is determined. For example, the rolling speed at the stand that is immediately before the final stand=rolling speed of the final stand×(1−rolling reduction of final stand). Further, the inter-pass time period=distance between passes/rolling speed of stand that is immediately before the final stand. Therefore, the inter-pass time period and strain rate of all stands can be determined based on the distance between passes and the cumulative true strain (reduction in sheet thickness).

At the last four stands, strain is imparted under conditions satisfying the following formula (iii).

$$1.2 \leq \ln(t_0/t) \leq 2.8 \qquad \text{(iii)}$$

Where, $\ln(t_0/t)$ represents true strain (logarithmic strain) accumulating through reduction in sheet thickness, $t_0$ represents the sheet thickness (mm) immediately before entering the last four stands, and t represents the sheet thickness (mm) immediately after exiting from the last four stands.

If the value of $\ln(t_0/t)$ is less than 1.2, the strain required for recrystallization will not be imparted at the final stand, and the aspect ratio of prior-austenite grains will be large. If the value of $\ln(t_0/t)$ is more than 2.8, the sheet thickness reduction will be too large and the inter-pass time period will lengthen, and consequently sufficient strain will not be imparted at the final stand, recrystallization will no longer be possible, and the aspect ratio of prior-austenite grains will be large. Thus, if the value of $\ln(t_0/t)$ is less than 1.2 or more than 2.8, since prior-austenite grains in the hot-rolled steel sheet will be flat, austenite nucleation will be heterogeneous, and blocky shaped austenite will be easily formed in the final micro-structure after secondary annealing.

At the final stand of the last four stands, rolling is performed under conditions in which the strain rate and rolling exit side temperature satisfy formula (iv) below.

$$11.0 \leq \log(v \cdot \exp(33000/(273+T))) \leq 15.0 \qquad \text{(iv)}$$

Where, v represents the strain rate (s$^{-1}$) at the final stand, and T represents the rolling exit side temperature (° C.) at the final stand. Formula (iv) was derived based on the Zener-Hollomon parameter (Z parameter) that is a function of strain rate and temperature:

$$Z = \varepsilon \cdot \exp(Q/(R(T+273)))$$

($\varepsilon$: strain rate, T: rolling exit side temperature at final stand, Q: apparent activation energy, R: gas constant)

If the value of $\log(v \cdot \exp(33000/(273+T)))$ is less than 11.0, it means that the strain rate is slow or the rolling temperature is high, or that both the strain rate is slow and the rolling temperature is high, and therefore the average grain size of the obtained prior-austenite grains will coarsen, and coarse blocky shaped austenite will be liable to form in the final micro-structure after secondary annealing.

If the value of $\log(v \cdot \exp(33000/(273+T)))$ is more than 15.0, it means that the strain rate is fast or the rolling temperature is low, or that both the strain rate is fast and the rolling temperature is low, and therefore austenite will not recrystallize, the prior-austenite grain size in the hot-rolled steel sheet will be flat, austenite nucleation will be heterogeneous, and blocky shaped austenite will be liable to form in the final micro-structure after secondary annealing.

With respect to the strain rate v, the value thereof is not restricted as long as the strain rate v satisfies formula (iv).

With regard to the rolling exit side temperature T, in order to obtain an equiaxial prior-austenite grain size, it is necessary to cause recrystallization in the austenite single phase. If ferrite is formed during rolling, recrystallization of austenite will be suppressed by the ferrite, and the grain size of prior-austenite after hot rolling will be flat. Therefore, by setting the rolling exit side temperature to 780° C. or more, austenite is single-phase and recrystallization is promoted, and equiaxial martensite is easily obtained.

Cooling after Finish Rolling:

To finely maintain the recrystallized austenite microstructure created by rolling, cooling is started within 1.0 s after the end of rolling at the final stand, and the cooling to 750° C. is performed at an average cooling rate of 100° C./s or more.

If the time until starting cooling after rolling is more than 1.0 s, because time is taken from the time recrystallization occurs until the time cooling is started, fine grain regions will be absorbed by coarse grains due to Ostwald growth, and prior-austenite grains will become coarse, austenite nucleation will be heterogeneous, and blocky shaped austenite will easily form in the final micro-structure after secondary annealing.

If the cooling rate is less than 100° C./s, grain growth of austenite will occur during cooling also, and the prior-austenite grains will be coarse and coarse blocky shaped austenite will be liable to form in the final micro-structure after secondary annealing.

Whilst an upper limit of the cooling rate is not particularly limited, in consideration of facility constraints and the like, and furthermore to make the micro-structure distribution in the sheet thickness direction more uniform, the upper limit of the cooling rate is preferably 600° C./s or less.

After cooling ends, in order to prevent grain growth occurring and the prior-austenite grains coarsening, cooling to 750° C. at an average cooling rate of 100° C./s or more is performed. Thereafter, cooling is performed in the temperature range from 750° C. to 300° C. at an average cooling rate of 10° C./s or more. In order to make the micro-structure after hot rolling homogeneous, the average cooling rate is 10° C./s or more. Note that, although the cooling rate from 300° C. to a coiling temperature that is described later is not particularly limited, from the viewpoint of productivity, cooling at the cooling rate used in the temperature range from 750° C. to 300° C. may be performed as it is until reaching the coiling temperature.

Coiling Temperature: Less than 300° C.

The coiling temperature after cooling is preferably made less than 300° C. By making the coiling temperature less than 300° C., the micro-structure after hot rolling can be made uniform. The coiling temperature is more preferably 250° C. or less. To suppress the occurrence of cracks during cold rolling, after cooling is performed to room temperature, before or after pickling prior to cold rolling, the hot-rolled steel sheet may be tempered in a temperature range of 300 to 600° C.

<Cold Rolling Process>

The hot-rolled steel sheet is subjected to pickling in the usual manner, and thereafter cold rolling is performed to form a cold-rolled steel sheet. From the viewpoint of refining the micro-structure of the steel sheet after annealing, the rolling reduction in the cold rolling is preferably set to 20% or more. From the viewpoint of suppressing the occurrence of ruptures during cold rolling, the rolling reduction in the cold rolling is preferably set to 70% or less.

Since it is advantageous from the standpoint of guaranteeing flatness, at a time which is before cold rolling and is before or after pickling, it is preferable to perform light rolling with a reduction of more than 0% to about 5% to rectify the shape. Further, performing this light rolling before pickling improves the pickling properties so as to promote removal of elements which concentrate at the surface, and has the effect of improving chemical treatment properties and plating treatment properties.

<Primary Annealing Process>

Annealing of the aforementioned cold-rolled steel sheet is performed in the temperature region of austenite single phase. In the present invention, this annealing is called "primary annealing". By performing the primary annealing, an initial micro-structure mainly composed of martensite can be formed, and thereafter the retained austenite micro-structure of the present application can be formed during secondary annealing in a temperature region that is a dual-phase region of ferrite and austenite. The primary annealing also reduces the formation of bainite and ferrite in the final micro-structure. The primary annealing conditions preferably satisfy the ranges described below.

Whilst the annealing may be performed using either of an annealing furnace and a continuous annealing line, preferably the primary annealing and the secondary annealing to be described later are each performed using a continuous annealing line. By using a continuous annealing line, the productivity can be improved. The annealing is preferably performed in a reducing atmosphere, and for example may be performed in a reducing atmosphere containing 98% nitrogen and 2% hydrogen. In addition, the steel sheet after cold rolling may be subjected to skin pass rolling.

Average Heating Rate: 5 to 30° C./s

The average heating rate from the heating start temperature (room temperature) to the primary annealing temperature is preferably 5 to 30° C./s. The productivity can be improved by setting the heating rate in the primary annealing process within this range.

Primary Annealing Temperature: More than 750° C. and $Ac_3$ Point or More

By setting the primary annealing temperature to more than 750° C., the distribution of ferrite in the steel sheet after the secondary annealing can be made more uniform, and thus the strength-ductility balance and strength can be improved. In order to make the content of ferrite in the micro-structure after secondary annealing 5% or less, the primary annealing temperature is the $Ac_3$ point or more. Further, to suppress damage to the annealing furnace and improve productivity, the primary annealing temperature is preferably 950° C. or less.

Here, the $Ac_3$ point is calculated by the following method. As a result of measuring $Ac_3$ points at a heating rate of 0.5 to 50° C./s with respect to a plurality of kinds of cold-rolled steel sheets containing C: more than 0.18% and less than 0.30%, Si: 0.01% or more and less than 2.00%, Mn: more than 2.50% and 4.00% or less, and sol. Al: 0.001% or more and less than 3.00%, and examining the measured values, the following formula (vii) was obtained as the $Ac_3$ point. The $Ac_3$ point can be calculated using this formula.

$$Ac_3 = 910 - 200\sqrt{C} + 44Si - 25Mn + 44Al \quad \text{(vii)}$$

Where, each symbol of an element in formula (vii) represents a content (mass %) of each corresponding element contained in the steel.

Primary Annealing Time: 10 to 1000 s

In order to completely remove non-recrystallized grains in the micro-structure after the secondary annealing and stably secure a good strength-ductility balance, the primary annealing temperature is held for 10 s or more. On the other hand, if the primary annealing time is more than 1000 s, the micro-structure after primary annealing will coarsen and nucleation sites of austenite during the secondary annealing will be heterogeneous, and consequently the retained austenite will coarsen and it will be difficult to make the total area of retained austenite grains having an area of 1 $\mu m^2$ or more and a grain shape circularity of 0.1 or more less than 50% with respect to the entire area of retained austenite.

Cooling is performed from the temperature held in the temperature region of more than 750° C. and the $Ac_3$ point or more to a temperature region of 300° C. or less under the condition that the average cooling rate to 300° C. is 10 to 2000° C./s. By cooling at an average cooling rate of 10° C./s or more, formation of ferrite in the micro-structure after primary annealing can be further suppressed. On the other hand, by making the average cooling rate 2000° C./s or less, the steel sheet temperature distribution after cooling is stopped is uniform, and therefore the flatness of the steel sheet can be improved. In consideration of facility constraints and the like, the average cooling rate is more preferably 600° C./s or less.

The cooling stopping temperature for the cooling after primary annealing is preferably set to 100° C. or more. By setting the cooling stopping temperature to 100° C. or more, the occurrence of strain accompanying martensitic transformation can be suppressed and the flatness of the steel sheet can be improved.

After cooling is performed to 300° C. or less at an average cooling rate of 10 to 2000° C./s, preferably a temperature region of 100 to 300° C. is held for 10 to 1000 s. By setting the holding time in the temperature region of 100 to 300° C. to 10 s or more, C distribution to austenite proceeds sufficiently, and austenite can be formed in the micro-structure before secondary annealing, and as a result, the formation of blocky shaped austenite in the micro-structure after secondary annealing can be further suppressed and fluctuations in the strength characteristics can be reduced. On the other hand, even if the holding time is more than 1000 s, the effect obtained by the aforementioned action will be saturated and the productivity will merely decrease, and therefore the holding time in the temperature region of 100 to 300° C. is preferably 1000 s or less, and more preferably is 300 s or less.

By setting the aforementioned holding temperature to 100° C. or more, the efficiency of the continuous annealing line can be improved. On the other hand, by setting the holding temperature to 300° C. or less, formation of ferrite can be further suppressed.

Final Cooling Temperature: Less than 100° C.

After the aforementioned cooling, cooling is performed to less than 100° C. By setting the final cooling temperature to less than 100° C., the micro-structure after primary annealing can be made a lath martensite microstructure. From the viewpoint of ensuring safety during transportation of the steel sheet, the steel sheet is preferably cooled to room temperature (50° C. or less).

<Secondary Annealing Process>

The annealed steel sheet obtained by the aforementioned primary annealing process is subjected to further annealing in a temperature region that is a dual-phase region of ferrite and austenite. In the present invention, this annealing is referred to as "secondary annealing". By performing secondary annealing, it is easy to obtain retained austenite in which Mn is concentrated and tempered martensite in which Si is concentrated. The secondary annealing conditions preferably satisfy the ranges described hereunder.

Average Heating Rate: 1 to 40° C./s

The average heating rate is preferably set to 1° C./s or more in order to make the area fraction of ferrite 5% or less. On the other hand, if the heating rate is too fast, the driving force for austenite formation will be large, and instead of martensite laths, austenite will form from the prior-austenite grain boundaries, and consequently coarse blocky shaped austenite will form in the micro-structure after secondary annealing. Therefore, the average heating rate is preferably set in the range of 1 to 40° C./s. The average heating rate is more preferably 2° C./s or more, and further preferably is 3° C./s or more. In addition, the average heating rate is more preferably less than 20° C./s, and further preferably is less than 10° C./s.

By increasing the temperature at such an average heating rate, the formation of coarse blocky shaped austenite, that is, retained austenite having an area of 1 µm$^2$ or more and a grain shape circularity of 0.1 or more can be suppressed, and the area fraction of coarse blocky shaped austenite with respect to the entire area of retained austenite can be made less than 50%.

Secondary Annealing Temperature: 650° C. or More and Less than Ac$_3$ Point

By setting the secondary annealing temperature to 650° C. or more and less than the Ac$_3$ point, retained austenite and tempered martensite can be caused to form in the micro-structure after secondary annealing, and the strength-ductility balance and impact characteristics can be improved. Further, Mn can be caused to concentrate in the retained austenite, and Si can be caused to concentrate in the tempered martensite.

Secondary Annealing Holding Time: 300 s or More

When a homogeneous steel micro-structure is obtained by the production method described above, Mn is also uniformly distributed. Therefore, by holding for 300 s or more at the secondary annealing temperature, Mn is concentrated to the retained austenite from the ferrite and tempered martensite, and contributes to improving the impact characteristics and the strength-ductility balance. Further, by dissolving cementite and causing retained austenite to form, the strength-ductility balance is improved by transformation induced plasticity. In addition, Si is concentrated to the tempered martensite from the retained austenite, and favorable strength and impact characteristics can be stably secured.

Note that, generally, if the holding time is long, coarsening of retained austenite grains occurs. However, in the present invention, as described above, because the finishing hot rolling is controlled so as to satisfy formula (iii) and formula (iv), fine austenite is uniformly formed during the secondary annealing, and even if the holding time is 300 s or more, the coarsening of retained austenite grains can be suppressed.

In the cooling after the secondary annealing process, if soft ferrite and bainite excessively form it will be difficult to secure sufficient strength in the steel material after the heat treatment, and therefore cooling is preferably performed at an average cooling rate of 5° C./s or more from the annealing temperature to 50° C. or less. From the viewpoint of suppressing quenching cracks in the steel sheet, the upper limit of the average cooling rate from the annealing temperature to 50° C. or less is preferably 500° C./s or less.

<Plating Process>

In the case of plating the steel sheet, the plated steel sheet is produced as follows.

In the case of subjecting the surface of the steel sheet to hot dip galvanizing to produce a hot dip galvanized steel sheet, the cooling after the second annealing described above is stopped in a temperature range of 430 to 500° C., and next the cold-rolled steel sheet is immersed in a plating bath of molten zinc to perform a hot dip galvanizing treatment. It suffices to set the plating bath conditions within the normal range. After the plating treatment, it suffices to cool the steel sheet to room temperature.

In the case of subjecting the surface of the steel sheet to hot dip galvannealing to produce a hot dip galvannealed steel sheet, after subjecting the steel sheet to the hot dip galvanizing treatment and before cooling the steel sheet to room temperature, the hot dip galvanized layer is subjected to an alloying treatment at a temperature of 450 to 620° C. It suffices to set the alloying treatment conditions within the normal range.

Hereunder, the present invention is described more specifically by way of examples, although the present invention is not limited to these examples.

EXAMPLES

1. Production of Steel Sheets for Evaluation

Steels having the chemical compositions shown in Table 1 were melted using a vacuum furnace, and cast pieces were obtained.

TABLE 1

| Steel | Chemical composition (mass %, balance: Fe and impurities) | | | | | | | | | Ac$_3$ (° C.) |
|---|---|---|---|---|---|---|---|---|---|---|
| | C | Si | Mn | sol. Al | P | S | N | O | Others | |
| A | 0.25 | 1.15 | 3.65 | 0.04 | 0.005 | 0.0009 | 0.004 | 0.001 | — | 771 |
| B | 0.26 | 1.13 | 3.63 | 0.03 | 0.009 | 0.0011 | 0.004 | 0.001 | Ti: 0.060 | 768 |
| C | 0.24 | 1.14 | 2.41 | 0.03 | 0.012 | 0.0011 | 0.003 | 0.001 | — | 803 |
| D | 0.17 | 0.75 | 3.12 | 0.04 | 0.011 | 0.0012 | 0.003 | 0.001 | — | 784 |
| E | 0.28 | 0.05 | 3.41 | 0.03 | 0.010 | 0.0010 | 0.004 | 0.001 | — | 723 |
| F | 0.19 | 1.10 | 3.38 | 0.04 | 0.011 | 0.0013 | 0.003 | 0.001 | — | 788 |
| G | 0.26 | 1.22 | 2.92 | 0.03 | 0.012 | 0.0011 | 0.003 | 0.001 | — | 790 |
| H | 0.24 | 0.68 | 3.52 | 0.05 | 0.011 | 0.0013 | 0.004 | 0.001 | — | 756 |
| I | 0.24 | 1.12 | 3.60 | 0.03 | 0.011 | 0.0007 | 0.004 | 0.001 | Nb: 0.020, Ti: 0.010, Mg: 0.001 | 773 |
| J | 0.25 | 1.08 | 3.39 | 0.04 | 0.009 | 0.0008 | 0.003 | 0.001 | Ni: 0.41, Cu: 0.12, Ca: 0.001 | 775 |
| K | 0.25 | 1.23 | 3.63 | 0.03 | 0.008 | 0.0013 | 0.004 | 0.001 | Mo: 0.05, Zr: 0.002 | 775 |
| L | 0.24 | 1.18 | 3.73 | 0.03 | 0.013 | 0.0012 | 0.003 | 0.001 | Cr: 0.22, REM: 0.001, Sb: 0.002 | 772 |
| M | 0.24 | 1.13 | 3.69 | 0.04 | 0.011 | 0.0011 | 0.004 | 0.001 | V: 0.020, B: 0.001 | 771 |
| N | 0.25 | 1.21 | 3.61 | 0.03 | 0.010 | 0.0010 | 0.003 | 0.001 | W: 0.03, Bi: 0.001 | 774 |
| O | 0.23 | 1.25 | 3.58 | 0.03 | 0.012 | 0.0010 | 0.004 | 0.001 | Sn: 0.001 | 781 |

TABLE 1-continued

| | Chemical composition (mass %, balance: Fe and impurities) | | | | | | | | Ac₃ |
|---|---|---|---|---|---|---|---|---|---|
| Steel | C | Si | Mn | sol. Al | P | S | N | O | Others | (° C.) |
| P | 0.22 | 0.15 | 3.51 | 0.04 | 0.009 | 0.0011 | 0.003 | 0.001 | — | 737 |
| Q | 0.21 | 0.07 | 3.71 | 0.03 | 0.010 | 0.0012 | 0.003 | 0.001 | — | 730 |

After heating the obtained cast pieces at 1250° C. for 1 hour, hot rolling was performed under the conditions shown in Table 2 to obtain hot-rolled steel sheets. Note that, in each case the finish rolling exit side temperature was in the austenite single-phase region. Further, the cooling rate from 300° C. to the coiling temperature was made the same as the cooling rate from 750° C. to 300° C. With regard to coiling, as a simulation thereof, after holding for 30 min at a predetermined temperature corresponding to the coiling temperature, furnace cooling to room temperature at 10° C./h was performed. With regard to a coiling condition of less than 100° C., this means that the hot-rolled steel sheet was cooled to room temperature under predetermined cooling conditions after finish rolling. After performing pickling of the obtained hot-rolled steel sheet, tempering was performed at the tempering temperature shown in Table 2, followed by cold rolling at the cold rolling rate to obtain a cold-rolled steel sheet. The tempering time before cold rolling was set to 1 hour.

TABLE 2

| | | Hot rolling condition | | | | | | |
|---|---|---|---|---|---|---|---|---|
| Test No. | Steel | Finish rolling exit side temperature T (° C.) | Strain rate v (/s) | Thickness before entering t₀ (mm) | Thickness after exiting t (mm) | Middle value of formula (iii)† | Middle value of formula (iv)‡ | Time until starting cooling (s) |
| 1 | A | 896 | 15 | 40 | 5.0 | 2.1 | 13.4 | 0.5 |
| 2 | A | 915 | 15 | 30 | 2.0 | 2.7 | 13.2 | 0.5 |
| 3 | A | 927 | 15 | 30 | 1.0 | 3.4 | 13.1 | 0.5 |
| 4 | B | 887 | 12 | 40 | 6.2 | 1.9 | 13.4 | 0.5 |
| 5 | B | 891 | 12 | 40 | 6.2 | 1.9 | 13.4 | 0.5 |
| 6 | C | 914 | 15 | 40 | 3.5 | 2.4 | 13.2 | 0.5 |
| 7 | D | 874 | 12 | 40 | 4.2 | 2.3 | 13.6 | 0.5 |
| 8 | E | 857 | 12 | 40 | 4.0 | 2.3 | 13.8 | 0.5 |
| 9 | F | 910 | 12 | 40 | 4.2 | 2.3 | 13.2 | 0.5 |
| 10 | F | 898 | 12 | 40 | 4.2 | 2.3 | 13.3 | 0.5 |
| 11 | G | 887 | 20 | 30 | 4.2 | 2.0 | 13.7 | 0.5 |
| 12 | G | 898 | 20 | 30 | 4.2 | 2.0 | 13.5 | 0.5 |
| 13 | H | 945 | 10 | 40 | 4.2 | 2.3 | 12.8 | 0.6 |
| 14 | H | 949 | 5 | 40 | 6.0 | 1.9 | 12.4 | 0.6 |
| 15 | H | 949 | 12 | 40 | 6.0 | 1.9 | 12.8 | 3.0 |
| 16 | I | 867 | 30 | 40 | 3.0 | 2.6 | 14.0 | 0.6 |
| 17 | J | 942 | 10 | 40 | 6.2 | 1.9 | 12.8 | 0.5 |
| 18 | J | 876 | 1 | 40 | 5.0 | 2.1 | 12.5 | 0.5 |
| 19 | K | 926 | 12 | 40 | 4.2 | 2.3 | 13.0 | 0.8 |
| 20 | L | 858 | 12 | 40 | 4.0 | 2.3 | 13.8 | 0.5 |
| 21 | L | 893 | 12 | 40 | 4.0 | 2.3 | 13.4 | 0.5 |
| 22 | L | 921 | 12 | 40 | 4.0 | 2.3 | 13.1 | 0.5 |
| 23 | M | 886 | 15 | 40 | 5.0 | 2.1 | 13.5 | 0.6 |
| 24 | M | 930 | 10 | 25 | 10.0 | 0.9 | 12.9 | 0.5 |
| 25 | N | 920 | 5 | 40 | 6.0 | 1.9 | 12.7 | 0.6 |
| 26 | N | 782 | 30 | 40 | 3.0 | 2.6 | 15.1 | 0.6 |
| 27 | O | 891 | 12 | 40 | 6.0 | 1.9 | 13.4 | 0.6 |
| 28 | O | 901 | 12 | 40 | 2.0 | 3.0 | 13.3 | 0.6 |
| 29 | P | 884 | 15 | 40 | 5.0 | 2.1 | 13.6 | 0.5 |
| 30 | P | 918 | 15 | 40 | 4.0 | 2.3 | 13.2 | 0.5 |
| 31 | A | 915 | 15 | 30 | 2.0 | 2.7 | 13.2 | 0.5 |
| 32 | L | 898 | 10 | 30 | 4.0 | 2.0 | 13.2 | 0.5 |
| 33 | L | 913 | 10 | 30 | 4.0 | 2.0 | 13.1 | 0.5 |
| 34 | Q | 887 | 10 | 40 | 4.0 | 2.3 | 13.4 | 0.5 |
| 35 | Q | 924 | 10 | 40 | 4.0 | 2.3 | 13.0 | 0.5 |
| 36 | O | 910 | 10 | 40 | 5.0 | 2.1 | 13.1 | 0.6 |
| 37 | N | 913 | 5 | 40 | 5.0 | 2.1 | 12.8 | 0.6 |

| | Hot rolling condition | | | Tempering condition | Cold rolling condition |
|---|---|---|---|---|---|
| Test No. | Cooling rate after finish rolling to 750° C. (° C./s) | Cooling rate from 750° C. to 300° C. (° C./s) | Coiling temperature (° C.) | Tempering temperature (° C.) | Cold rolling rate (%) |
| 1 | 107 | 50 | 150 | 500 | 40 |
| 2 | 108 | 50 | 150 | 500 | 40 |
| 3 | 107 | 50 | 150 | not performed | 40 |

TABLE 2-continued

| | | | | | |
|---|---|---|---|---|---|
| 4 | 107 | 50 | 150 | 500 | 40 |
| 5 | 100 | 50 | 150 | 500 | 40 |
| 6 | 100 | 50 | 150 | 500 | 40 |
| 7 | 101 | 50 | <100 | not performed | 40 |
| 8 | 103 | 50 | 250 | 450 | 40 |
| 9 | 110 | 50 | <100 | 500 | 40 |
| 10 | 103 | 50 | <100 | 500 | 40 |
| 11 | 106 | 50 | <100 | not performed | 40 |
| 12 | 102 | 50 | <100 | not performed | 40 |
| 13 | 107 | 50 | 250 | 500 | 40 |
| 14 | 108 | 50 | 250 | 500 | 40 |
| 15 | 109 | 50 | 250 | 500 | 40 |
| 16 | 110 | 50 | 250 | not performed | 40 |
| 17 | 100 | 50 | 150 | not performed | 40 |
| 18 | 103 | 50 | 150 | not performed | 40 |
| 19 | 110 | 50 | <100 | 450 | 40 |
| 20 | 102 | 50 | 250 | 500 | 40 |
| 21 | 100 | 50 | 250 | 500 | 40 |
| 22 | 107 | 50 | 250 | 500 | 40 |
| 23 | 105 | 50 | 150 | 500 | 40 |
| 24 | 104 | 50 | 150 | 500 | 40 |
| 25 | 101 | 50 | <100 | 450 | 40 |
| 26 | 102 | 50 | <100 | 450 | 40 |
| 27 | 112 | 50 | 150 | 500 | 40 |
| 28 | 102 | 50 | 150 | 500 | 40 |
| 29 | 107 | 50 | 150 | 500 | 40 |
| 30 | 103 | 50 | 150 | 500 | 40 |
| 31 | 108 | $\underline{1}$ | 150 | 500 | 40 |
| 32 | 102 | $\underline{50}$ | 250 | 500 | 40 |
| 33 | 102 | 50 | 250 | 500 | 40 |
| 34 | 105 | 50 | 250 | 500 | 40 |
| 35 | 101 | 50 | 150 | 500 | 40 |
| 36 | 104 | 50 | 150 | 500 | 40 |
| 37 | 110 | 50 | <100 | 450 | 40 |

†$1.2 \leq \ln(t_0/t) \leq 2.8$ ... (iii)
‡$11.0 \leq \log(v \cdot \exp(33000/(273 + T))) \leq 15.0$ ... (iv)

Each obtained cold-rolled steel sheet was subjected to primary annealing and secondary annealing under the conditions shown in Table 3 to prepare an annealed cold-rolled steel sheet. The primary annealing and secondary annealing of the cold-rolled steel sheet were each carried out in a reducing atmosphere containing 98% nitrogen and 2% hydrogen. The average heating rate from the heating start temperature (room temperature) to the primary annealing temperature in the primary annealing was set to 15° C./s. Further, in the secondary annealing, cooling was performed from the secondary annealing temperature to room temperature (50° C. or less) at an average cooling rate of 50° C./s.

TABLE 3

| | | Primary annealing condition | | | | | | |
|---|---|---|---|---|---|---|---|---|
| Test No. | Steel | Primary annealing temperature (° C.) | Primary annealing time (s) | Average cooling rate to 300° C. (° C./s) | Cooling stopping temperature (° C.) | Holding temperature after cooling stopping (° C.) | Holding time (s) | Final cooling temperature (° C.) |
| 1 | A | 800 | 80 | 50 | 250 | 250 | 30 | 50 |
| 2 | A | 800 | 60 | 50 | 250 | 250 | 30 | 40 |
| 3 | A | | | not performed | | | | |
| 4 | B | 800 | 80 | 50 | 250 | 250 | 30 | 40 |
| 5 | B | $\underline{720}$ | 80 | 50 | 250 | 250 | 30 | 40 |
| 6 | C | $\underline{850}$ | 80 | 50 | 250 | 250 | 30 | 50 |
| 7 | $\underline{D}$ | 800 | 60 | 100 | 250 | 250 | 30 | 50 |
| 8 | $\underline{E}$ | 800 | 80 | 50 | 250 | 250 | 30 | 50 |
| 9 | F | 800 | 60 | 100 | 250 | 250 | 30 | 50 |
| 10 | F | $\underline{700}$ | 60 | 100 | 250 | 250 | 30 | 50 |
| 11 | $\underline{G}$ | 800 | 80 | 50 | 200 | 200 | 30 | 60 |
| 12 | G | 800 | 80 | 50 | 200 | 200 | 30 | 60 |
| 13 | H | 780 | 80 | 50 | 250 | 250 | 30 | 50 |
| 14 | H | | | not performed | | | | |
| 15 | H | 780 | 80 | 50 | 250 | 250 | 30 | 50 |
| 16 | I | 820 | 80 | 50 | 250 | 250 | 30 | 50 |
| 17 | J | 800 | 40 | 50 | 200 | 200 | 30 | 50 |
| 18 | J | 800 | 40 | 50 | 200 | 200 | 30 | 50 |
| 19 | K | 800 | 60 | 100 | 250 | 250 | 30 | 40 |
| 20 | L | 800 | 60 | 50 | 250 | 250 | 30 | 50 |
| 21 | L | 800 | $\underline{5}$ | 50 | 250 | 250 | 30 | 50 |
| 22 | L | 800 | $\underline{60}$ | 50 | 250 | 250 | 30 | 50 |

TABLE 3-continued

| 23 | M | 800 | 60 | 100 | 250 | 250 | 30 | 50 |
| 24 | M | 800 | 60 | 100 | 250 | 250 | 30 | 50 |
| 25 | N | 800 | 80 | 50 | 250 | 250 | 30 | 40 |
| 26 | N | 800 | 80 | 50 | 250 | 250 | 30 | 40 |
| 27 | O | 800 | 60 | 50 | 200 | 200 | 30 | 50 |
| 28 | O | 800 | 60 | 50 | 200 | 200 | 30 | 50 |
| 29 | P | 800 | 80 | 50 | 250 | 250 | 30 | 40 |
| 30 | P | 800 | 80 | 50 | 250 | 250 | 30 | 40 |
| 31 | A | 800 | 60 | 50 | 250 | 250 | 30 | 40 |
| 32 | L | 800 | 60 | 50 | 250 | 250 | 30 | 50 |
| 33 | L | 800 | 60 | 50 | 250 | 250 | 30 | 50 |
| 34 | Q | 800 | 80 | 50 | 250 | 250 | 60 | 50 |
| 35 | L | 800 | 80 | 50 | 250 | 250 | 60 | 50 |
| 36 | O | 800 | 60 | 50 | 80 | — | — | 80 |
| 37 | N | 800 | 1050 | 50 | 250 | 250 | 30 | 40 |

| Test No. | Secondary annealing condition ||||| Post-process Presence of plating and alloying |
| --- | --- | --- | --- | --- | --- |
| | Secondary annealing temperature (° C.) | Average heating rate (° C./s) | Secondary annealing time (s) | Cooling rate after secondary annealing (° C./s) | |
| 1 | 720 | 5 | 450 | 30 | |
| 2 | 730 | 5 | 350 | 30 | |
| 3 | 720 | 3 | 450 | 30 | |
| 4 | 720 | 10 | 450 | 50 | |
| 5 | 720 | 10 | 450 | 50 | |
| 6 | 750 | 10 | 350 | 30 | |
| 7 | 700 | 10 | 350 | 30 | |
| 8 | 680 | 5 | 450 | 30 | |
| 9 | 750 | 10 | 450 | 50 | Plating |
| 10 | 730 | 0.5 | 450 | 50 | |
| 11 | 700 | 5 | 450 | 30 | Alloying |
| 12 | 750 | 50 | 450 | 30 | |
| 13 | 690 | 10 | 450 | 30 | |
| 14 | 680 | 10 | 450 | 30 | |
| 15 | 690 | 10 | 450 | 30 | |
| 16 | 730 | 5 | 350 | 30 | |
| 17 | 710 | 5 | 350 | 30 | |
| 18 | 790 | 5 | 350 | 30 | |
| 19 | 720 | 5 | 500 | 30 | |
| 20 | 720 | 5 | 600 | 50 | |
| 21 | 720 | 5 | 450 | 50 | |
| 22 | 600 | 5 | 450 | 50 | |
| 23 | 730 | 10 | 450 | 30 | |
| 24 | 740 | 10 | 450 | 30 | |
| 25 | 680 | 3 | 450 | 30 | |
| 26 | 680 | 3 | 450 | 30 | |
| 27 | 740 | 5 | 350 | 30 | |
| 28 | 740 | 5 | 350 | 30 | |
| 29 | 680 | 10 | 450 | 30 | |
| 30 | 700 | 5 | 600 | 30 | |
| 31 | 680 | 5 | 450 | 30 | |
| 32 | 720 | 5 | 450 | 1 | |
| 33 | 720 | 5 | 100 | 50 | |
| 34 | 740 | 5 | 450 | 50 | |
| 35 | 680 | 5 | 600 | 50 | |
| 36 | 740 | 5 | 350 | 30 | |
| 37 | 720 | 10 | 400 | 30 | |

For some of the annealed cold-rolled steel sheets, cooling after the secondary annealing was stopped at 460° C., and a hot dip galvanizing treatment was performed in which the cold-rolled steel sheet was immersed for 2 s in a plating bath of molten zinc at 460° C. The conditions of the plating bath were the same as the conventional conditions. In a case where an alloying treatment that is described later was not to be performed, after holding at 460° C., cooling to room temperature was performed at an average cooling rate of 10° C./s.

For some of the annealed cold-rolled steel sheet examples, after performing the hot dip galvanizing treatment, next an alloying treatment was performed without cooling to room temperature. The alloying treatment was performed by heating to 520° C., and holding at 520° C. for 5 s, and thereafter cooling was performed to room temperature at an average cooling rate of 10° C./s.

The annealed cold-rolled steel sheets obtained in this way were subjected to temper rolling at an elongation percentage of 0.1%, to thereby prepare various steel sheets for evaluation.

2. Evaluation Method

The obtained annealed cold-rolled steel sheet of each example was subjected to microstructure observation, a tensile test, an impact characteristics test, and a bending test, and the area fractions of tempered martensite, ferrite, retained austenite, bainite, and fresh martensite, the tensile strength (TS), the elongation after fracture (tEL), the impact characteristics, and the bendability were evaluated. The respective evaluation methods were as follows.

The area fractions of tempered martensite, ferrite, retained austenite, bainite, and fresh martensite were calculated based on micro-structure observation using an SEM and X-ray diffraction measurement. An L cross section of the steel sheet was subjected to mirror-polishing, and next the microstructure was revealed using 3% nital, the microstructure at a position ¼ of the thickness from the surface was observed using an SEM at a magnification of ×5000, and image analysis (Photoshop (registered trademark)) was performed on an area of 100 μm×300 μm to calculate the area fractions of tempered martensite, ferrite and bainite, as well as the total area fraction of retained austenite and fresh martensite.

Further, a specimen of a 25 mm in width and 25 mm in length was cut out from each obtained steel sheet, and the specimen was subjected to chemical polishing to reduce the sheet thickness by ¼. The surface of the specimen after the chemical polishing was subjected to X-ray diffraction analysis three times using a Co tube, the obtained profiles were analyzed, and the area fraction of retained austenite was calculated by averaging the respective profiles. The area fraction of fresh martensite was calculated by subtracting the area fraction of retained austenite from the total area fraction of retained austenite and fresh martensite obtained by SEM observation.

(Grain Shape Circularity and Area of Retained Austenite Grains)

The grain shape circularity and area of the grains were measured by performing EBSP analysis using a standard function (Map and Grain Shape Circularity) of OIM Analysis version 7 manufactured by TSL Company Ltd.

The EBSP data measurement conditions were as follows. At a position at a depth of ¼ of the sheet thickness from the surface of the L cross section of the steel sheet, regions of 50 μm×50 μm were observed at a magnification of ×500 using an SEM equipped with an OIM (Orientation Imaging Microscopy) detector, and EBSP data was measured at measurement intervals of 0.1 μm. The EBSP data was measured for five regions by the above method, and the average value for the five regions was calculated.

($C_{Mn\gamma}/C_{Mn\alpha}$ and $C_{Si\alpha}/C_{Si\gamma}$)

$C_{Mn\gamma}/C_{Mn\alpha}$, and $C_{Si\alpha}/C_{Si\gamma}$ were measured by EBSP, an SEM, and an EPMA. Using EBSP and an SEM, regions of 50 μm×50 μm were observed at a magnification of ×500, and EBSP data was measured at measurement intervals of 0.1 μm, and retained austenite, ferrite, and tempered martensite were identified for five regions. Next, with respect to the identified retained austenite, ferrite and tempered martensite, point analysis by EPMA measurement was performed at five points in each of five regions, the measured values were averaged to calculate $C_{Mn\gamma}$, $C_{Mn\alpha}$, and $C_{Si\gamma}$, and $C_{Mn\gamma}/C_{Mn\alpha}$, and $C_{Si\alpha}/C_{Si\gamma}$ were determined.

(Tensile Test Method)

A JIS No. 5 tensile test specimen was taken from a direction perpendicular to the rolling direction of the steel sheet, the tensile strength (TS) and elongation after fracture (tEL) were measured, and TS×tEL was calculated. The tensile test was performed by a method defined in JIS Z2241: 2011 using a JIS No. 5 tensile test specimen in which the length of a parallel portion was 60 mm and the gage length serving as a reference for measuring strain was 50 mm.

(Method for Evaluating Impact Characteristics)

A V-notch test specimen was prepared from each steel material after the heat treatment. If the thickness of the test specimen was 4.8 mm or more, the test specimen was used as it was, while if the thickness was less than 4.8 mm, the minimum number of sheets required to obtain a thickness of 4.8 mm or more were stacked and screwed together, and thereafter the test specimen was subjected to a Charpy impact test in conformity with JIS Z2242: 2005. If the Charpy impact value at 20° C. was 20 J/cm$^2$ or more, the impact characteristics were evaluated as good, while if the Charpy impact value was less than 20 J/cm$^2$, the impact characteristics were evaluated as poor.

(Method for Evaluating Bendability)

From each steel sheet after annealing, a bending test specimen having a width (direction to be a bending ridge line) of 20 mm and a length (direction orthogonal to rolling direction) of 50 mm was prepared so that the bending ridge line was in the rolling direction. The width direction of the bending test specimen was parallel to the bending axis. The bending test was performed according to the V-block method specified in JIS Z 2248: 2006. At such time, using a V-shaped punch with a tip angle of 90 degrees, a bending test was performed in which the values of R/t obtained by dividing the punch radius R (mm) by the sheet thickness t (mm) of the specimen were R/t=2.0 and 3.0, and if a crack was observed at the R/t values of 3.0 and 2.0, the bendability was evaluated as poor, if a crack was observed only under the condition of the R/t value of 2.0, the bendability was evaluated as good, and if a crack was not observed under the conditions of both the R/t values of 2.0 and 3.0, the bendability was evaluated as very good.

3. Evaluation Results

The results of the above evaluations are shown in Table 4. In the present examples, the examples in which a TS of 780 MPa or more, a TS×tEL of 22,000 MPa % or more, good impact characteristics, and good bendability were obtained were evaluated as steel sheets that have high strength and are excellent in strength-ductility balance, bendability and impact characteristics.

TABLE 4

| Test No. | Steel | Micro-structure (area %) | | | | | Area fraction of coarse and round retailed austenite[#] (%) | $C_{Mn\gamma}/C_{Mn\alpha}$ |
|---|---|---|---|---|---|---|---|---|
| | | Tempered martensite | Ferrite | Retained austenite | Bainite | Fresh martensite | | |
| 1 | A | 76 | 0 | 16 | 0 | 8 | 27 | 1.5 |
| 2 | A | 72 | 0 | 15 | 0 | 13 | 26 | 1.4 |
| 3 | A | <u>0</u> | <u>76</u> | 8 | 4 | 12 | 48 | 1.4 |
| 4 | B | 75 | 0 | 16 | 0 | 9 | 23 | 1.5 |
| 5 | B | 63 | <u>12</u> | 14 | 0 | 11 | 43 | 1.4 |
| 6 | <u>C</u> | 74 | 0 | 7 | 0 | 19 | 31 | 1.3 |
| 7 | <u>D</u> | 84 | 0 | <u>5</u> | 0 | 11 | 36 | 1.4 |
| 8 | <u>E</u> | 75 | 0 | 17 | 0 | 8 | 24 | 1.4 |

TABLE 4-continued

| Test No. | Steel | | | | | | | |
|---|---|---|---|---|---|---|---|---|
| 9 | F | 64 | 0 | 16 | 3 | 17 | 23 | 1.6 |
| 10 | F | 58 | <u>13</u> | 14 | 0 | 15 | 25 | 1.5 |
| 11 | G | 72 | <u>0</u> | 17 | 3 | 8 | 22 | 1.5 |
| 12 | G | 67 | 0 | <u>8</u> | 0 | 25 | <u>58</u> | 1.4 |
| 13 | H | 77 | 0 | <u>17</u> | 0 | 6 | <u>19</u> | 1.4 |
| 14 | H | <u>14</u> | <u>69</u> | 8 | 0 | 9 | <u>65</u> | 1.3 |
| 15 | H | <u>77</u> | <u>0</u> | <u>9</u> | 0 | 14 | <u>55</u> | 1.3 |
| 16 | I | 67 | 0 | <u>17</u> | 0 | 16 | <u>32</u> | 1.4 |
| 17 | J | 74 | 0 | 18 | 0 | 8 | 26 | 1.4 |
| 18 | J | <u>6</u> | 0 | <u>4</u> | 3 | <u>87</u> | 28 | 1.4 |
| 19 | K | <u>71</u> | 0 | <u>20</u> | 0 | <u>9</u> | 21 | 1.7 |
| 20 | L | 65 | 0 | 22 | 0 | 13 | 23 | 1.7 |
| 21 | L | 66 | <u>10</u> | 12 | 0 | 12 | 38 | 1.4 |
| 22 | L | 74 | <u>20</u> | 6 | 0 | 0 | 34 | <u>1.1</u> |
| 23 | M | 68 | <u>0</u> | <u>17</u> | 0 | 15 | 23 | <u>1.4</u> |
| 24 | M | 70 | 0 | 9 | 0 | 21 | <u>52</u> | 1.2 |
| 25 | N | 80 | 0 | <u>14</u> | 0 | 6 | <u>23</u> | 1.3 |
| 26 | N | 85 | 0 | 9 | 0 | 6 | <u>61</u> | 1.2 |
| 27 | O | 75 | 0 | <u>15</u> | 0 | 10 | <u>25</u> | 1.4 |
| 28 | O | 75 | 0 | 8 | 0 | 17 | <u>55</u> | 1.4 |
| 29 | P | 77 | 0 | <u>14</u> | 0 | 9 | <u>26</u> | 1.3 |
| 30 | P | 68 | 0 | 17 | 0 | 15 | 25 | 1.6 |
| 31 | A | 80 | 0 | 8 | 0 | 12 | <u>53</u> | 1.3 |
| 32 | L | 60 | 9 | 16 | 6 | 9 | <u>23</u> | 1.4 |
| 33 | L | 73 | <u>0</u> | 9 | <u>0</u> | 18 | 21 | <u>1.1</u> |
| 34 | Q | <u>16</u> | 0 | <u>7</u> | 0 | <u>77</u> | 31 | <u>1.4</u> |
| 35 | Q | <u>72</u> | 0 | 19 | 2 | <u>7</u> | 23 | 1.5 |
| 36 | O | 73 | 0 | 13 | 0 | 14 | 30 | 1.3 |
| 37 | N | 77 | 0 | <u>9</u> | 0 | 14 | <u>58</u> | 1.2 |

| | | Mechanical properties | | | | | |
|---|---|---|---|---|---|---|---|
| Test No. | $C_{Si\alpha}/C_{Si\gamma}$ | TS (MPa) | tEl (%) | TS × tEL | Collision characteristics | Bendability | |
| 1 | 1.2 | 1101 | 21.0 | 23121 | Good | Very good | Inventive example |
| 2 | 1.2 | 1140 | 20.1 | 22914 | Good | Good | Inventive example |
| 3 | 1.2 | 1230 | 8.8 | 10824 | Poor | Good | Comparative example |
| 4 | 1.2 | 1110 | 20.8 | 23088 | <u>Good</u> | Very good | Inventive example |
| 5 | 1.1 | 974 | 18.1 | 17629 | Good | Good | Comparative example |
| 6 | 1.2 | 1193 | 17.0 | 20281 | <u>Poor</u> | Good | Comparative example |
| 7 | 1.1 | 930 | 16.7 | 15531 | <u>Poor</u> | Good | Comparative example |
| 8 | 1.0 | 1064 | 20.7 | 22025 | <u>Good</u> | Very good | Inventive example |
| 9 | 1.2 | 1182 | 21.5 | 25413 | Good | Good | Inventive example |
| 10 | 1.2 | 973 | 18.6 | 18098 | Good | Good | Comparative example |
| 11 | 1.2 | 1107 | 20.9 | 23136 | Good | Very good | Inventive example |
| 12 | 1.3 | 1270 | 15.0 | 19050 | Poor | Poor | Comparative example |
| 13 | 1.1 | 1050 | 21.3 | 22365 | <u>Good</u> | Very good | Inventive example |
| 14 | 1.1 | 1150 | 8.5 | 9775 | Poor | Poor | Comparative example |
| 15 | 1.1 | 1174 | 18.4 | 21602 | <u>Poor</u> | <u>Poor</u> | Comparative example |
| 16 | 1.2 | 1164 | 19.5 | 22698 | <u>Good</u> | <u>Good</u> | Inventive example |
| 17 | 1.2 | 1070 | 20.7 | 22149 | Good | Very good | Inventive example |
| 18 | 1.1 | 1490 | 8.8 | 13162 | Poor | Poor | Comparative example |
| 19 | 1.2 | 1130 | 22.4 | 25312 | <u>Good</u> | Very good | Inventive example |
| 20 | 1.2 | 1187 | 22.8 | 27064 | Good | Good | Inventive example |
| 21 | 1.2 | 973 | 17.3 | 16833 | Good | Good | Comparative example |
| 22 | 1.0 | 784 | 17.1 | 13406 | Poor | Good | Comparative example |
| 23 | 1.2 | 1170 | 19.6 | 22932 | <u>Good</u> | Good | Inventive example |
| 24 | 1.2 | 1213 | 16.0 | 19408 | Poor | Poor | Comparative example |
| 25 | 1.2 | 1030 | 21.5 | 22145 | <u>Good</u> | Very good | Inventive example |
| 26 | 1.1 | 992 | 17.0 | 16864 | Poor | Poor | Comparative example |
| 27 | 1.2 | 1125 | 20.2 | 22725 | <u>Good</u> | Very good | Inventive example |
| 28 | 1.2 | 1154 | 17.0 | 19618 | Poor | Poor | Comparative example |
| 29 | 1.1 | 1095 | 20.2 | 22119 | <u>Good</u> | Very good | Inventive example |
| 30 | 1.1 | 1134 | 21.7 | 24608 | Good | Good | Inventive example |
| 31 | 1.2 | 1083 | 19.1 | 20685 | Poor | Poor | Comparative example |
| 32 | 1.2 | 945 | 20.2 | 19089 | <u>Good</u> | <u>Good</u> | Comparative example |
| 33 | 1.0 | 1240 | 16.1 | 19964 | Poor | Good | Comparative example |
| 34 | 1.0 | 1350 | 10.1 | 13635 | <u>Poor</u> | Poor | Comparative example |
| 35 | 1.0 | 991 | 22.4 | 22198 | <u>Good</u> | Very good | Inventive example |
| 36 | 1.1 | 1168 | 18.9 | 22075 | Good | Good | Inventive example |
| 37 | 1.1 | 1151 | 17.8 | 20488 | Poor | Poor | Comparative example | means a proportion of a total area of retained austenite grains having an area of 1 μm$^2$ or more and having a grain shape circularity of 0.1 or more

INDUSTRIAL APPLICABILITY

According to the present invention, a steel sheet that has high strength and is excellent in strength-ductility balance, bendability and impact characteristics can be obtained. Therefore, the steel sheet of the present invention is most suitable for use in structural components of automobiles such as pillars.

The invention claimed is:

1. A steel sheet, having a chemical composition consisting of, in mass %,
C: more than 0.18% and less than 0.30%,
Si: 0.01% or more and less than 2.00%,
Mn: more than 2.50% and 4.00% or less,
sol. Al: 0.001% or more and less than 3.00%,
P: 0.100% or less,
S: 0.010% or less,
N: less than 0.050%,
O: less than 0.020%,
Cr: 0% or more and less than 2.00%,
Mo: 0 to 2.00%,
W: 0 to 2.00%,
Cu: 0 to 2.00%,
Ni: 0 to 2.00%,
Ti: 0 to 0.300%,
Nb: 0 to 0.300%,
V: 0 to 0.300%,
B: 0 to 0.010%,
Ca: 0 to 0.010%,
Mg: 0 to 0.010%,
Zr: 0 to 0.010%,
REM: 0 to 0.010%,
Sb: 0 to 0.050%,
Sn: 0 to 0.050%,
Bi: 0 to 0.050%, and
the balance: Fe and impurities,
wherein:
in a cross section parallel to a rolling direction and a sheet thickness direction of the steel sheet, a steel micro-structure at a position at a depth of ¼ of a sheet thickness from a surface is, in area %:
tempered martensite: 25 to 90%,
ferrite: 5% or less,
retained austenite: 10 to 50%, and
bainite: 5% or less;
at a position at a depth of ¼ of the sheet thickness from a surface of a cross section parallel to the rolling direction and the sheet thickness direction of the steel sheet, a proportion of a total area of retained austenite grains having an area of 1 µm² or more and having a grain shape circularity of 0.1 or more is less than 50% with respect to an entire area of the retained austenite; and
an Mn concentration in the steel micro-structure at a position at a depth of ¼ of the sheet thickness from the surface satisfies formula (i) below:

$$C_{Mn\gamma}/C_{Mn\alpha} \geq 1.2 \quad (i)$$

where, meaning of each symbol in formula (i) above is as follows:
$C_{Mn\gamma}$: average Mn concentration (mass %) in retained austenite
$C_{Mn\alpha}$: average Mn concentration (mass %) in ferrite and tempered martensite.

2. The steel sheet according to claim 1, wherein:
in mass %,
Si: 0.10% or more and less than 2.00%; and
an Si concentration in the steel micro-structure at a position at a depth of ¼ of the sheet thickness from the surface of a cross section parallel to the rolling direction and the sheet thickness direction of the steel sheet satisfies formula (ii) below:

$$C_{Si\alpha}/C_{Si\gamma} \geq 1.1 \quad (ii)$$

where, meaning of each symbol in formula (ii) above is as follows:
$C_{Si\alpha}$: average Si concentration (mass %) in tempered martensite and ferrite
$C_{Si\gamma}$: average Si concentration (mass %) in retained austenite.

3. The steel sheet according to claim 1, wherein:
one or more kinds of element is selected from, in mass %,
Cr: 0.01% or more and less than 2.00%,
Mo: 0.01 to 2.00%,
W: 0.01 to 2.00%,
Cu: 0.01 to 2.00%, and
Ni: 0.01 to 2.00%.

4. The steel sheet according to claim 1, wherein:
one or more kinds of element is selected from, in mass %,
Ti: 0.005 to 0.300%,
Nb: 0.005 to 0.300%, and
V: 0.005 to 0.300%.

5. The steel sheet according to claim 1, wherein:
one or more kinds of element is selected from, in mass %,
B: 0.0001 to 0.010%,
Ca: 0.0001 to 0.010%,
Mg: 0.0001 to 0.010%,
Zr: 0.0001 to 0.010%, and
REM: 0.0001 to 0.010%.

6. The steel sheet according to claim 1, wherein:
one or more kinds of element is selected from, in mass %,
Sb: 0.0005 to 0.050%,
Sn: 0.0005 to 0.050%, and
Bi: 0.0005 to 0.050%.

7. The steel sheet according to claim 1, having:
a hot dip galvanized layer on a surface of the steel sheet.

8. The steel sheet according to claim 1, having:
a hot dip galvannealed layer on a surface of the steel sheet.

9. The steel sheet according to claim 1, wherein:
a Charpy impact value at 20° C. is 20 J/cm² or more.

10. The steel sheet according to claim 2, having:
a hot dip galvanized layer on a surface of the steel sheet.

11. The steel sheet according to claim 2, having:
a hot dip galvannealed layer on a surface of the steel sheet.

12. The steel sheet according to claim 2, wherein:
a Charpy impact value at 20° C. is 20 J/cm² or more.

13. A method for producing a steel sheet, that is a method in which a hot rolling process, a cold rolling process, a primary annealing process and a secondary annealing process are performed in that order on steel having a chemical composition according to claim 1, wherein:
the hot rolling process includes a process of performing finish hot-rolling using a rolling mill having a plurality of stands, the number of which is four or more;
in the process of performing finish hot-rolling:
a sheet thickness reduction between before and after a last four stands among the plurality of stands satisfies formula (iii) below,
a strain rate at a final stand of the last four stands and a rolling exit side temperature at the final stand satisfy formula (iv) below, and
cooling to 750° C. at an average cooling rate of 100° C./s or more is performed within 1.0 s after rolling at the final stand, and cooling in a temperature range from 750° C. to 300° C. is performed at an average cooling rate of 10° C./s or more;
in the primary annealing process, after holding for 10 to 1000 s in a temperature region of more than 750° C. and an Ac₃ point or more, cooling is performed to a temperature region of 300° C. or less under a condition that an average cooling rate to 300° C. is 10 to 2000°

C./s, and thereafter cooling is performed to a temperature region of less than 100° C.; and in the secondary annealing process, heating is performed to a temperature region of 650° C. or more and less than the Ac₃ point at an average heating rate of 1 to 40° C./s, and is held in the temperature region for 300 s or more:

$$1.2 \leq \ln(t_0/t) \leq 2.8 \quad \text{(iii)}$$

$$11.0 \leq \log(v \cdot \exp(33000/(273+T))) \leq 15.0 \quad \text{(iv)}$$

where, meaning of each symbol in the above formulas is as follows:

$t_0$: sheet thickness (mm) immediately before entering last four stands t: sheet thickness (mm) immediately after exiting from last four stands v: strain rate (/s) at final stand T: rolling exit side temperature (C) at final stand, thereby producing the steel sheet of claim 1.

14. The method for producing a steel sheet according to claim 13, wherein:

in the primary annealing process, after holding for 10 s or more in a temperature region of more than 750° C. and the Ac₃ point or more, cooling is performed at an average cooling rate of 10 to 2000° C./s to a temperature region of 300° C. or less, and after holding for 10 to 1000 s in a temperature region of 100 to 300° C., cooling is performed to a temperature region of less than 100° C.

15. The method for producing a steel sheet according to claim 13, wherein:

after the secondary annealing process, cooling is performed, and a hot dip galvanizing treatment is performed.

16. The method for producing a steel sheet according to claim 15, wherein:

after the hot dip galvanizing treatment is performed, a hot dip galvanized layer is subjected to an alloying treatment in a temperature region of 450 to 620° C.

17. A steel sheet, having a chemical composition comprising, in mass %,

C: more than 0.18% and less than 0.30%,
Si: 0.01% or more and less than 2.00%,
Mn: more than 2.50% and 4.00% or less,
sol. Al: 0.001% or more and less than 3.00%,
P: 0.100% or less,
S: 0.010% or less,
N: less than 0.050%,
O: less than 0.020%,
Cr: 0% or more and less than 2.00%,
Mo: 0 to 2.00%,
W: 0 to 2.00%,
Cu: 0 to 2.00%,
Ni: 0 to 2.00%,
Ti: 0 to 0.300%,
Nb: 0 to 0.300%,
V: 0 to 0.300%,
B: 0 to 0.010%,
Ca: 0 to 0.010%,
Mg: 0 to 0.010%,
Zr: 0 to 0.010%,
REM: 0 to 0.010%,
Sb: 0 to 0.050%,
Sn: 0 to 0.050%,
Bi: 0 to 0.050%, and
the balance: Fe and impurities, wherein:

in a cross section parallel to a rolling direction and a sheet thickness direction of the steel sheet, a steel micro-structure at a position at a depth of ¼ of a sheet thickness from a surface is, in area %:

tempered martensite: 25 to 90%,
ferrite: 5% or less,
retained austenite: 10 to 50%, and
bainite: 5% or less;

at a position at a depth of ¼ of the sheet thickness from a surface of a cross section parallel to the rolling direction and the sheet thickness direction of the steel sheet, a proportion of a total area of retained austenite grains having an area of 1 µm² or more and having a grain shape circularity of 0.1 or more is less than 50% with respect to an entire area of the retained austenite; and an Mn concentration in the steel micro-structure at a position at a depth of ¼ of the sheet thickness from the surface satisfies formula (i) below:

$$C_{Mn\gamma}/C_{Mn\alpha} \geq 1.2 \quad \text{(i)}$$

where, meaning of each symbol in formula (i) above is as follows:

$C_{Mn\gamma}$: average Mn concentration (mass %) in retained austenite $C_{Mn\alpha}$: average Mn concentration (mass %) in ferrite and tempered martensite.

* * * * *